United States Patent [19]

Hastings

[11] Patent Number: 5,307,462
[45] Date of Patent: Apr. 26, 1994

[54] SWITCH FOR SHARING A PERIPHERAL DEVICE

[75] Inventor: Brian I. Hastings, Fort Collins, Colo.

[73] Assignee: Hewlett-Packard Company, Palo Alto, Calif.

[21] Appl. No.: 964,573

[22] Filed: Oct. 21, 1992

Related U.S. Application Data

[63] Continuation of Ser. No. 589,949, Sep. 28, 1990, abandoned.

[51] Int. Cl.⁵ ............................................. G06F 13/12
[52] U.S. Cl. ...................................... 395/275; 395/325; 364/DIG. 1; 364/238.2; 364/238.3; 364/239.7
[58] Field of Search ................ 395/275, 325, 425, 200

[56] References Cited

U.S. PATENT DOCUMENTS 3,675,209  7/1972  Trost .................................... 395/275
4,454,575  6/1984  Bushaw ................................ 395/275
4,562,533  12/1985  Hodel .................................. 395/275
4,858,108  8/1989  Ogawa ................................. 395/275
5,047,957  9/1991  Ikenoue ............................... 364/519

Primary Examiner—Debra A. Chun

[57] ABSTRACT

Disclosed is a switch that allows a peripheral device, such as a printer, to be shared by multiple computer systems. The switch connects to each of the computer systems, and also to the peripheral device being shared. The switch stores the current state of the peripheral device for each to the computer systems, so that when a particular system requests access to the peripheral device, the switch can restore the state of the peripheral device to the last state established by the system requesting usage. Therefore, the system requesting usage need not know that other systems may have used the peripheral device in the interim.

22 Claims, 6 Drawing Sheets

SWITCH FOR SHARING A PERIPHERAL DEVICE

CROSS REFERENCE TO RELATED APPLICATION

This is a continuation of copending application Ser. No. 07/589,949, filed on Sep. 28, 1990, now abandoned.

RELATED APPLICATIONS

This application is related to application Ser. No. 07/590,878, filed concurrently herewith on Sep. 28, 1990, of Richard L. Kochis and Michael D. Erickson, entitled "Device Sharing System using PCL Macros"

FIELD OF THE INVENTION

This invention relates to computer systems and more particularly to sharing peripheral devices on such systems. Even more particularly, the invention relates to sharing a peripheral device between two or more computers or other systems.

BACKGROUND OF THE INVENTION

In computer systems, particularly small or personal computer systems, peripheral devices make up a large part of the cost of the system. Where possible, it is desirable to share peripheral devices between several computer systems. When sharing a peripheral device, however, each time the device is switched from one system to another, it must be placed into a known state, preferably the same state it had when last used by this computer system.

In small computer systems, especially personal computer systems, the hardware and operating system software may lack the sophistication necessary to allow such sharing. Therefore, if peripherals in such systems are to be shared, the user of the system must manually re-initialize the peripheral device each time the computer systems are switched, in order to bring the device to a known state. This is very time consuming, and very difficult if the computer systems that share the device are not in close proximity. For remotely connected systems, determining if the peripheral device is currently in use is a major problem.

For some peripheral devices, such as printers, prior art manual or automatic switches may be used to switch the electrical connections from one computer system to another. Once switched to a particular computer, the interface to the other computers is set busy until the connected computer has not used the peripheral for a period of time, then the busy indication is removed and any of the computers can reacquire a connection. Each time the interface to the peripheral is switched, however, the computer now having control of the peripheral must re-initialize the peripheral to reestablish the state of the peripheral device. In the case of printers, this re-initialization involves restoring the printing resolution, page orientation (landscape or portrait), margins, fonts selected, page size, and other parameters. If the printer is being used by a word processing system, the user may not be aware of these parameters, and thus may be unable to re-initialize the printer to the state it had before being switched.

There is a need in the art then for a switch that allows a peripheral device to be shared between two or more computer systems, while saving the state of the peripheral device for each of the sharing computer systems. Another need is for such a switch that automatically restores the state of the peripheral each time the interface is switched, thus providing transparent switching. Still another need is for such a switch that will alert a computer system wishing to control a peripheral device that the device is currently being used by another system, thus allowing sharing of remotely connected computer systems. The present invention meets these needs.

SUMMARY OF THE INVENTION

It is an aspect of the present invention to allow two or more computer systems to share a peripheral device.

It is another aspect of the invention to monitor peripheral device commands from each computer system and store the state of the peripheral device.

Another aspect is to restore the peripheral device to the last state established by a computer system before accepting commands from that system.

Still another aspect of the invention is to signal busy to a second or subsequent computer system requesting services if the peripheral is currently performing functions for a first computer system.

A further aspect of the invention is to store data from a non-selected host until the peripheral device is available to process such data.

The above and other objects of the invention are accomplished in a switch that allows a peripheral device, such as a printer, to be shared by multiple computer systems. The switch connects to each of the computer systems, and also to the peripheral device being shared. The switch stores the current state of the peripheral device for each to the computer systems, so that when a particular system requests access to the peripheral device, the switch can restore the state of the peripheral device to the last state established by the system requesting usage. Therefore, the system need not know that other systems may have used the peripheral device, since the state of the peripheral device appears unchanged from the last time the system used the device.

In one embodiment of the switch, a printer is shared by a host computer system and a facsimile (FAX) section of a Multi-Functional Peripheral Device. When a facsimile transmission is received, the FAX section alerts the switch and the switch determines if the printer is currently being used by the host. If the printer is currently being used, the FAX section buffers the facsimile data until the printer is free or until the buffer fills. If the buffer becomes full before the printer is available, the FAX section sends an "out of paper" indication to the remote FAX to cause it to interrupt transmission. If the printer is being used by the FAX section when the host sends a print request, the host is given an indication that the printer is busy.

The switch monitors and interprets printer commands sent by the host and keeps a copy of the current printer state. When a facsimile transmission is received, the switch sets up the printer for receiving the FAX, and after the FAX is received and printed, the switch restores the host printer state, allowing the host to use the printer without knowing that a FAX has been printed since the last time the host used the printer.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
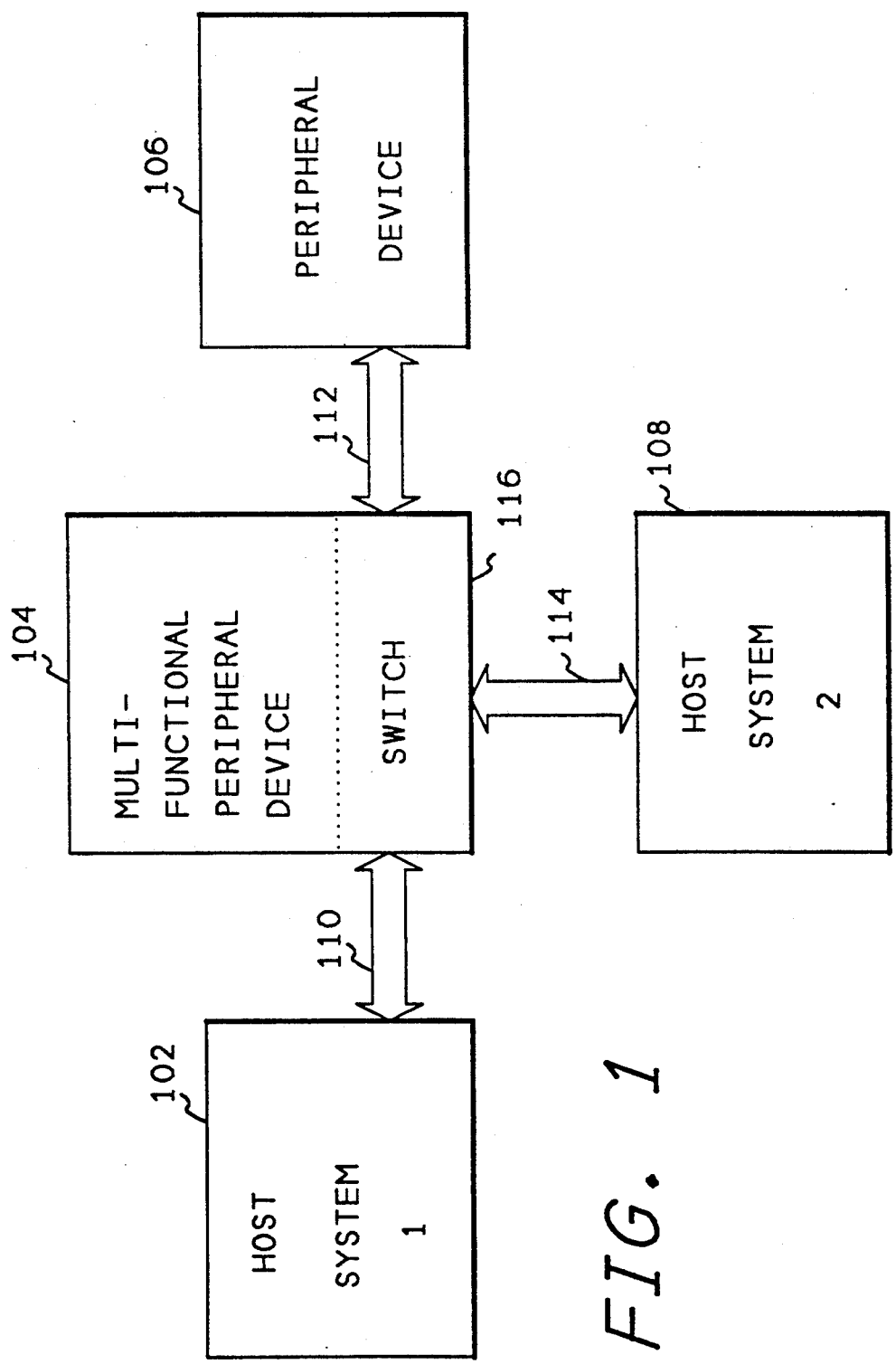
FIG. 1 shows a block diagram of the system of the present invention and its environment.

FIG. 1 shows a block diagram of the present invention and its environment. Referring now to FIG. 1, a first host system 102 is connected over a bus 110 to a switch 116 which is contained within a Multi-Functional Peripheral Device 104. The switch 116 is connected via a bus 112 to a peripheral device 106 which is being shared. A second host system 108 is connected via a bus 114 to the switch 116. The switch 116 of the present invention allows the first host system 102 and the second host system 108 to share the peripheral device 106.

Figure 2:
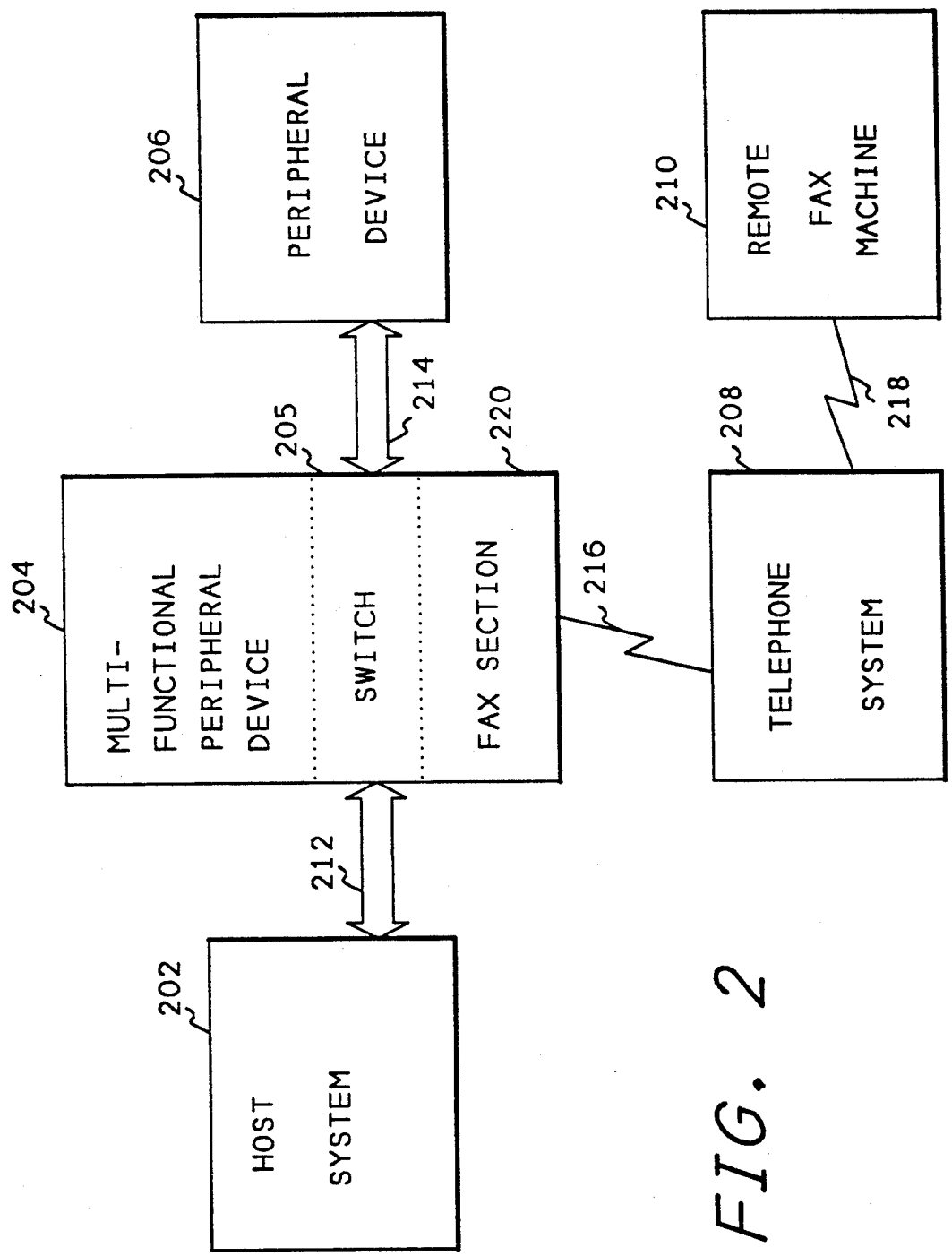
FIG. 2 shows a block diagram of the system being used to share a printer between a host computer and a FAX section of a Multi-Function Peripheral Device.

FIG. 2 shows a block diagram wherein the present invention is used to connect a host system and a FAX section of a Multi-Functional Peripheral Device to a printer. Referring now to FIG. 2, a host system 202 is connected via a bus 212 to a Multi-Functional Peripheral Device 204 which contains the switch 205 of the present invention and a FAX section 220. A remote FAX machine 210 is connected via wires 218 to a telephone system 208. The telephone system 208 is connected via wires 216 to the FAX section 220 of the Multi-Functional Peripheral Device. The switch 205 of the present invention is connected via a bus 214 to a printer 206.

The switch 205 allows the host system 202 to share the printer 206 with the FAX section 220. The FAX section 220 receives calls from the remote FAX machine 210 and if the host system is not using the printer, the switch 205 reconfigures the printer 206 to allow it to receive a FAX from the remote FAX machine 210. After the FAX transmission is complete, the switch 205 sends state information to the printer 206 to place it into the same state it was in prior to the FAX transmission. Therefore, the host system 202 is unaware that the printer has been used to receive a FAX. Should the host system 202 attempt to use the printer 206 while a FAX is being received from the remote FAX machine 210, the switch 205 presents a busy indication to the host system 202 over the bus 212. After the FAX transmission is complete, the switch 205 removes the busy indicator from the bus 212 allowing the host system 202 to continue to use the printer 206.

The switch 205 within the Multi-Functional Peripheral Device 204 monitors all commands sent from the host system 202 to the printer 206 in order to keep a copy of the printer state within RAM contained in the device 204. Therefore, after a FAX transmission is complete, the switch 205 can use its copy of the printer state to place the printer back into the state expected by the host system 202.

Figure 3:
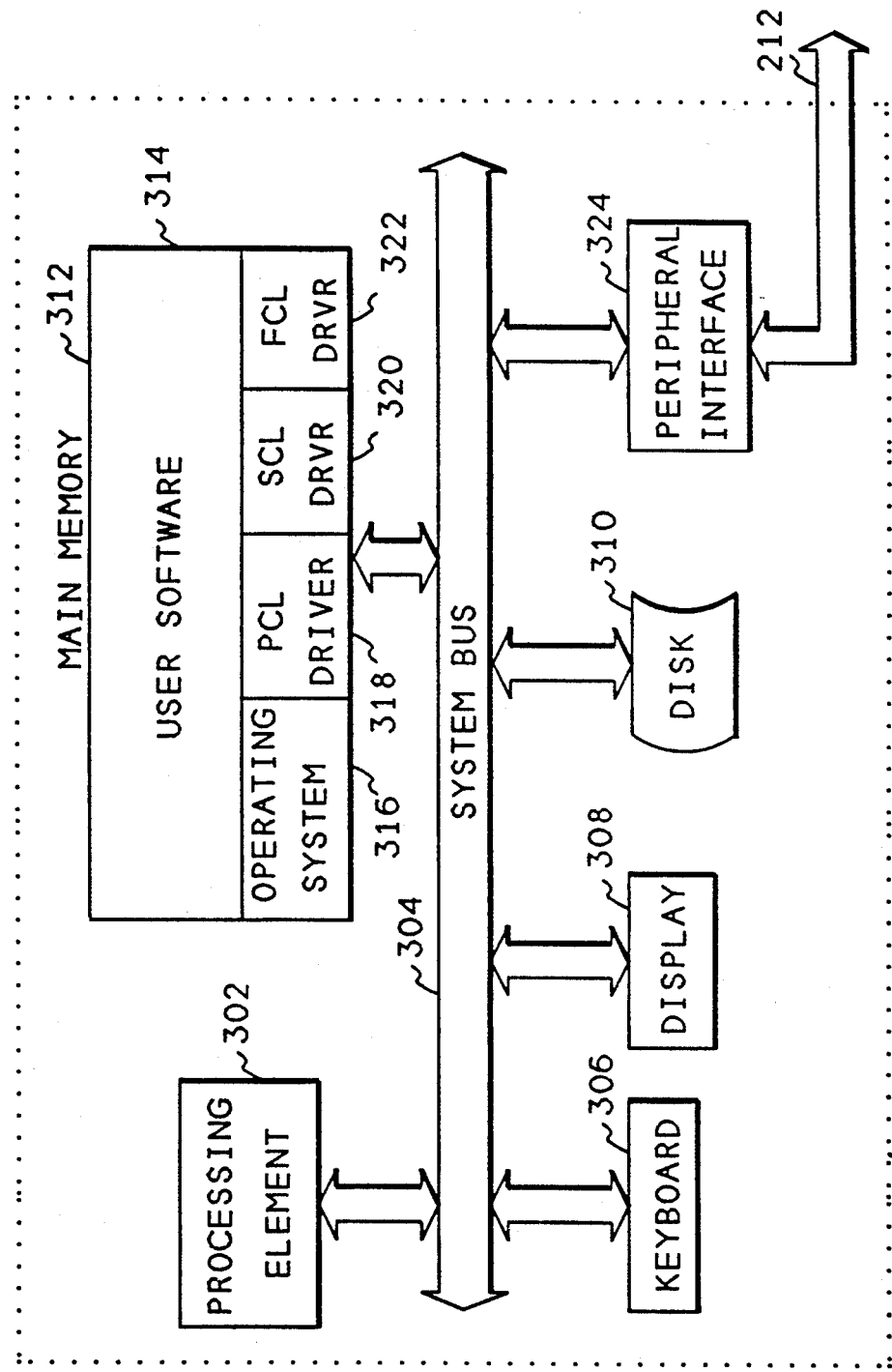
FIG. 3 shows a block diagram of the host computer system of FIG. 2.

FIG. 3 shows a block diagram of the host computer system 202 of FIG. 2, which is typical of host systems. The only requirement of a host system is that it have a parallel or serial interface to a printer. Referring now to FIG. 3, the host system 202 contains a processor 302 which is connected to the other components of the system over a system bus 304. A keyboard 306 allows a user of the host system 202 to enter information into the system. A display 308 allows information to be presented to the user of the host system 202. A disk 310 is used to store software and data for the host system 202 and a peripheral interface 324 is used to communicate over a bus 212 to the Multi-Functional Peripheral Device 204 containing the switch of the present invention. The peripheral interface 212 may be a serial interface such as RS/232, or a parallel interface such as the Centronics parallel printer interface.

A memory 312 contains user software 314 and an operating system 316. Printer Command Language (PCL) driver software 318 is used by the user software 314 to communicate to the printer 206 through the switch 205 of the present invention. A Scanner Command Language (SCL) driver module 320 is to communicate to a scanner device within the Multi-Functional Peripheral Device 204. A FAX Command Language (FCL) driver module 322 is used by the user software 314 to control all FAX functions within the Multi-Functional Peripheral Device 204.

Figure 4:
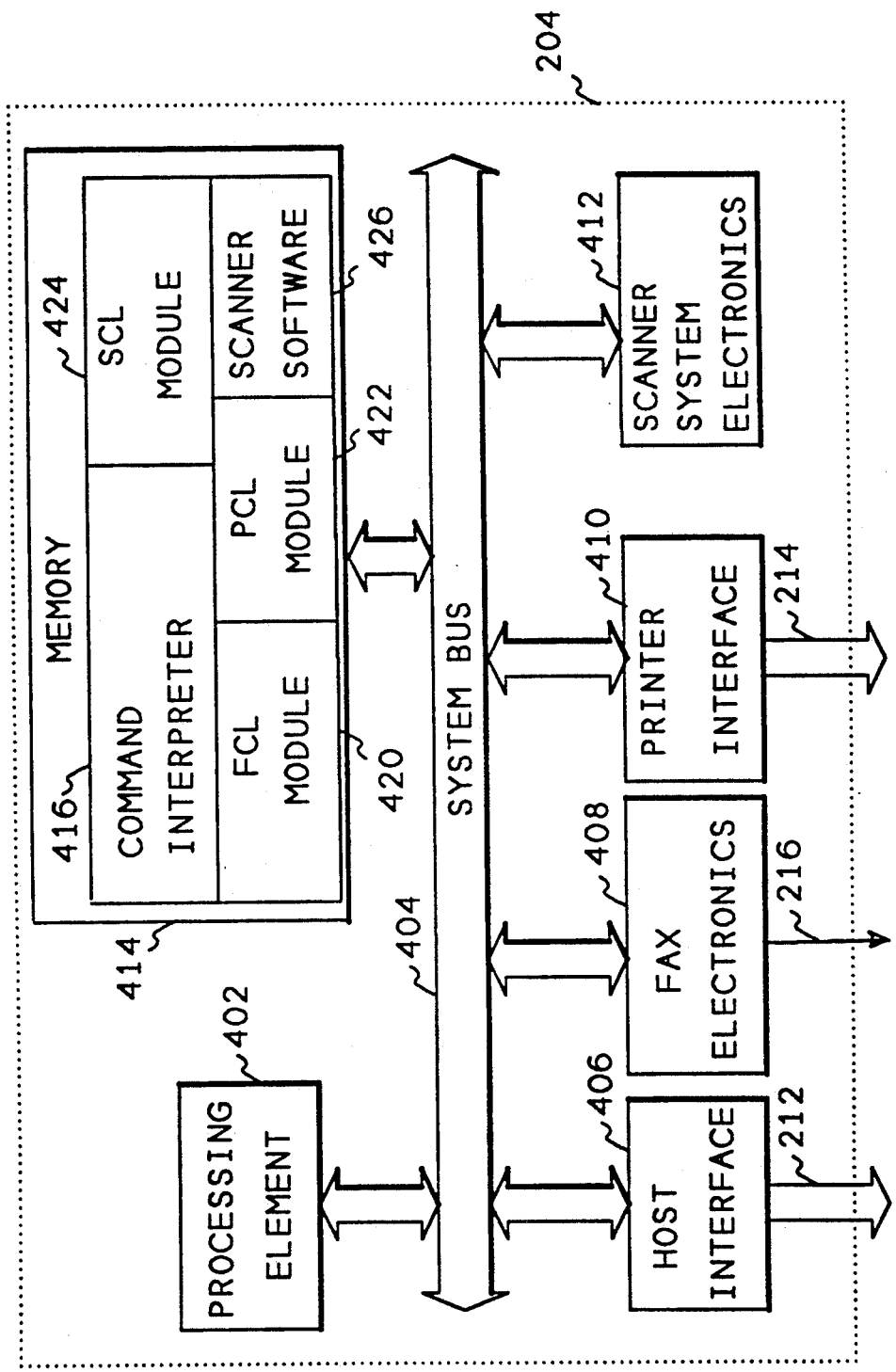
FIG. 4 shows a block diagram of the Multi-Functional Peripheral Device of FIG. 2, which contains the switch of the present invention.

FIG. 4 shows a block diagram of the Multi-Functional Peripheral Device 204, which contains the switch of the present invention. Referring now to FIG. 4, the Multi-Functional Peripheral Device 204 contains a processor 402 which communicates to other elements of the system over a system bus 404. A host system interface 406 is used to communicate with the host system 202 over the bus 212. FAX electronics 408 are used to communicate to the remote FAX 210 (FIG. 2) via the telephone system 208 (FIG. 2) over the bus 216. A printer interface 410 is used to send data to the printer 206 over the bus 214. Scanner system electronics 412 are used with a data scanning device which may also be part of the Multi-Functional Peripheral Device 204. A memory 414 contains a command interpreter 416 which routes PCL, FCL, and SCL commands between the PCL (318), FCL (322), and SCL (320) drivers in FIG. 3 and the PCL (422), FCL (420), and SCL (424) modules of FIG. 4. The PCL, FCL, and SCL modules within the Multi-Functional Peripheral Device 204 control the printer interface 410, the FAX electronics 408 and the scanner system electronics 412, respectively. The command interpreter 416 will be described below with respect to FIGS. 5 and 6. An FCL module 420 is used to process commands sent by the FCL driver module 322 (FIG. 3) in order to perform FAX related functions, including receiving and printing FAX messages on the shared printer 206. The FCL module 420 sends commands and status to the command interpreter 416 which processes those commands and sends them to the host system 202. The FCL module 420, when receiving a FAX, also sends data directly to a PCL module 422. The PCL module 422 receives commands and data from the command interpreter and the FCL module 420, and passes those commands through the printer interface 410 to the printer 206 (FIG. 2). An SCL module 424 receives scanner command language commands from the SCL driver module 320 (FIG. 3) and passes those commands to scanner system software 426 which interfaces to the scanner system electronics 412.

Figure 5:
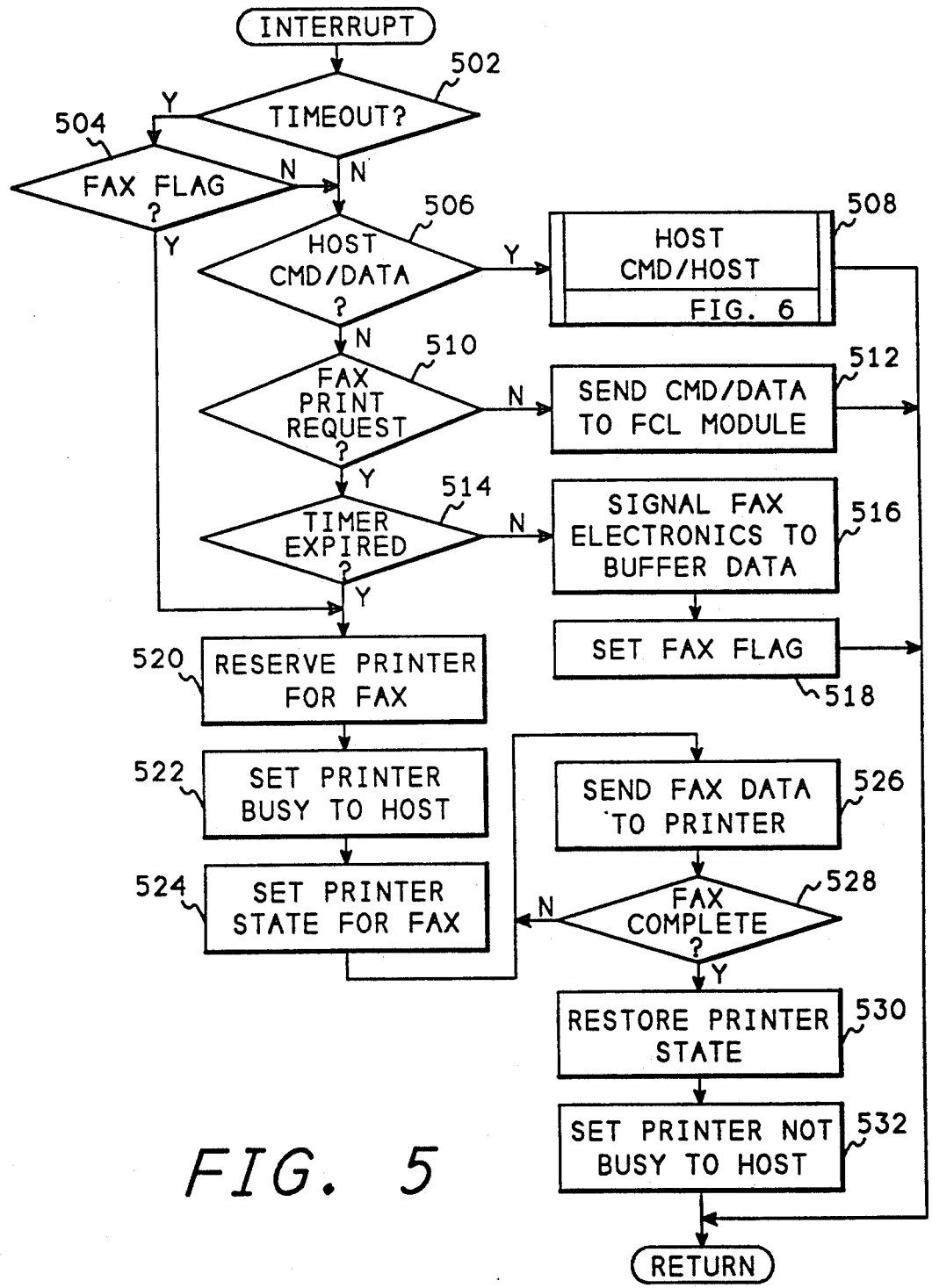
FIG. 5 shows a flowchart of the top level of the software within the switch of the present invention.
Figure 6:
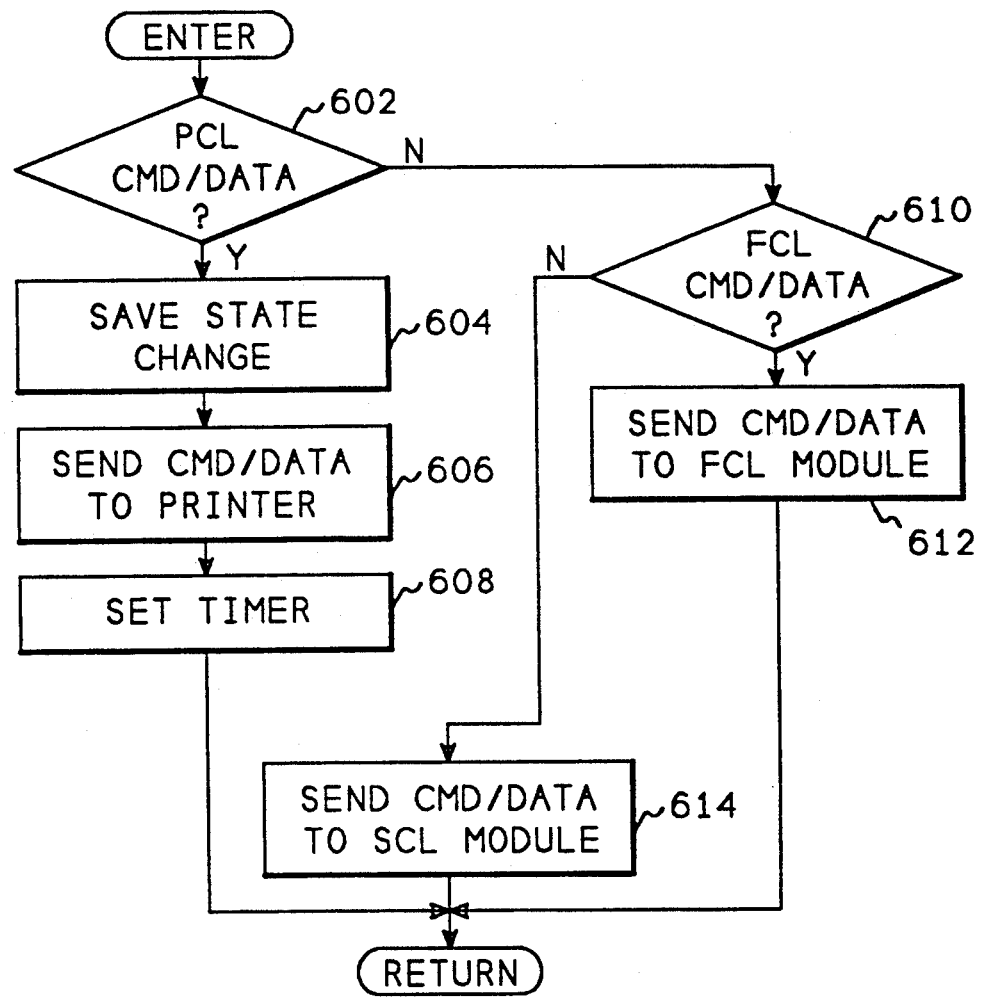
FIG. 6 shows a flowchart of the host data/command processing software of the present invention.

FIGS. 5 and 6 show flowcharts of the software of the command interpreter 416 of FIG. 4. This software is used to perform the switch function of the present invention, in conjunction with hardware described by the block diagram of FIG. 4. Referring now to FIGS. 5 and 6, this flowchart is entered when an interrupt occurs. The interrupt indicates that a command or data has arrived from either the host system of the FAX section of the Multi-Functional Peripheral Device. After entry, block 502 determines whether a timeout has occurred. A timeout will occur when the host system has completed using the printer. If a timeout has occurred, block 502 transfers to block 504 which determines if the FAX is waiting to print. If the FAX is waiting to print, block 504 transfers control to block 520 to start the FAX print, otherwise, block 504 transfers to block 506. Block 506 determines whether data or commands have been received from the host over the host interface 406. If data or a command has been received from the host, block 506 transfers to block 508 which calls FIG. 6 to process the data or command from the host before returning from the interrupt.

If a command or data has not been received from the host, block 506 transfers to block 510 which determines whether a print request has been received from the FAX section of the Multi-Functional Peripheral Device. If a FAX print request has not been received, then a command or data has been received from the FAX section, so block 510 transfers to block 512 to send the command or data to the FCL module for processing. If a FAX print request has been received from the FAX section, block 510 transfers to block 514 which determines if time has expired on the timer. If time has not expired, the host is still printing, so block 514 transfers to block 516 which signals the FAX electronics 408 to buffer the incoming FAX data. Then block 518 sets the FAX flag to indicate that the FAX is waiting to print.

If the timer has expired, block 514 transfers to block 520 which reserves the printer for the FAX, and block 522 sets a busy signal in interface 212 to indicate to the host that the printer is busy. Block 524 sends commands to the printer to set the printer state to allow a FAX print, and block 526 sends the first FAX data to the printer. Block 528 determines if all FAX data has been sent, and if not, block 528 transfers back to block 526 to send more data. After all FAX data has been sent, block 528 transfers to block 530 which sends commands to the printer to restore the printer state, and then block 532 removes the busy signal from interface 212 before returning from the interrupt.

FIG. 6 shows a flowchart of the host data command processing module called by block 508 (FIG. 5). Referring now to FIG. 6, after entry, block 602 determines whether printer command language commands or data were received. If not, block 602 transfers to block 610 which determines whether FAX command language commands or data were received. If FAX command language commands or data were received from the host, block 610 transfers to block 612 which sends the command or data to the FCL module for processing.

If FCL command/data information was not received, the system assumes that the command/data is for the SCL module, and control goes to block 614 to send the command or data to the SCL module for processing.

If PCL commands or data were received, block 602 transfers to block 604 which saves any change in the printer state in a buffer. Block 606 then sends the commands or data to the PCL module for processing, and block 608 sets a timer indicating that the host is using the printer. This timer is always set to a new value when new commands or data are received for the printer. Therefore, after the host has completed using the printer, the timer will time for a full five to ten seconds before the FAX will be allowed to use the printer. This provides sufficient time for the host to readdress the printer if more printing is to be done.

After setting the timer value, or after sending commands or data to the FCL or SEL modules, FIG. 6 returns to FIG. 5.

The state information for a printer includes print resolution, such as 300 dots per inch; page orientation, such as portrait or landscape; paper margins; selected fonts; and page size. Other parameters may also be included in the printer state depending upon the type of printer being used. Different state information might be needed for other peripheral devices. For example, a disk would have selected read/write head and current cylinder as state information.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A switch for sharing a peripheral device between a plurality of systems, said switch comprising:

a plurality of first transfer means for receiving data and commands from said plurality of systems;

a plurality of peripheral state storage areas contained within said switch, one said peripheral state storage area connected to each of said plurality of first transfer means;

a second transfer means for transferring data and commands from said switch to said peripheral device means for selectively connecting one of said first transfer means to said second transfer means comprising means for coupling said selected first transfer means to said second transfer means whereby data and commands received on said selected first transfer means are sent to said second transfer means, and means for transferring a state previously stored in said peripheral state storage area connected to said selected first transfer means to said second transfer means whereby said state is transferred to said peripheral device; and means for monitoring commands received on said selected first transfer means and for storing state changes in said connected peripheral state storage area.

2. The system of claim 1 wherein said means for selectively connecting further comprises means for continuously examining each of said plurality of first transfer means and for selectively connecting one of said first transfer means to said second transfer means upon receiving a datum or command from said one of said first transfer means.

3. The system of claim 2 further comprising means for disconnecting said selected first transfer means from said second transfer means after said selected first transfer means fails to send additional data or commands to said second transfer means for a predetermined period of time.

4. The system of claim 2 further comprising means for disconnecting said selected first transfer means from said second transfer means if said selected first transfer means sends a termination signal.

5. The system of claim 1 wherein said means for selectively connecting further comprises means for continuously examining each one of said plurality of first transfer means and for receiving and storing a predetermined amount of data and commands from said one of said first transfer means if said second transfer means is connected to another of said first transfer means.

6. The system of claim 5 wherein said means for continuously examining further comprises means for indicating a busy condition to said one of said first transfer means after receiving and storing said predetermined amount of data and commands and said second transfer means is still connected to another of said first transfer means.

7. The system of claim 1 wherein said means for selectively connecting further comprises means for continuously examining each one of said plurality of first transfer means and for indicating a busy condition to said one of said first transfer means if said second transfer means is connected to another of said first transfer means upon receiving a datum or command from said one of said first transfer means.

8. A process for sharing a peripheral device between a plurality of systems comprising the steps of:
 (a) selectively connecting one of said plurality of systems to a switch and further connecting said switch to said peripheral device whereby data and commands received from said selected system are sent to said peripheral device through said switch;
 (b) transferring a state previously stored in a peripheral state storage area, within said switch but connected to said selected system, to said peripheral device, whereby said peripheral device is set to a state previously defined by said selected system; and
 (c) monitoring commands received from said selected system and storing state changes in said connected peripheral state storage area within said switch.

9. The process of claim 8 wherein step (a) further comprises the steps of:
 (a1) continuously examining said plurality of systems and connecting one of said systems to said peripheral device upon receiving a datum or command from said one of said systems.

10. The process of claim 9 further comprising the step of:
 (d) disconnecting said selected system from said peripheral device after said selected system fails to send additional data or commands to said peripheral device for a predetermined period of time.

11. The system of claim 8 wherein step (a) further comprises the step of continuously examining each one of said plurality of systems and receiving and storing a predetermined amount of data and commands from said one of said systems if said peripheral device is connected to another of said systems upon receiving said predetermined amount of data and commands from said one of said plurality of systems.

12. The system of claim 11 wherein step (a1) further comprises the step of indicating a busy condition to said one of said systems after receiving and storing said predetermined amount of data and commands and said peripheral device is still connected to another of said systems.

13. The process of claim 8 wherein step (a) further comprises the step of continuously examining each one of said plurality of systems and indicating a busy condition to said one of said systems if said peripheral device is connected to another of said systems upon receiving a datum or command from said one of said plurality of systems.

14. The process of claim 8 wherein step (c) further comprises the step of:
 (c1) disconnecting said selected system from said peripheral device upon receiving a termination signal.

15. A switch for sharing a printer between a host computer system and a facsimile receiver, said switch comprising:
 host transfer means for receiving data and commands from said host computer system
 a peripheral state storage area contained in said switch;
 FAX transfer means for transferring data and commands form said facsimile receiver to said switch;
 printer transfer means for transferring data and commands from said switch to said printer;
 means for selectively connecting either said host transfer means or said FAX transfer means to said printer transfer means comprising
  means for coupling said selected transfer means to said printer transfer means whereby data and commands received on said selected transfer means are sent to said printer transfer means,
  means for transferring a state previously stored in said peripheral state storage area to said printer transfer means when said host transfer means is selected, whereby said state is transferred to said peripheral device, and
  means for transferring a predetermined state to said printer transfer means when said FAX transfer means is selected; and
 means for monitoring commands received on said host transfer means and for storing state changes in said peripheral state storage area.

16. The system of claim 15 wherein said means for selectively connecting further comprises means for continuously examining said host transfer means and said FAX transfer means and for selectively connecting either said host transfer means to said printer transfer means upon receiving a datum or command from said host transfer means, or connecting said FAX transfer means to said printer transfer means upon receiving a datum or command from said FAX transfer means.

17. The system of claim 16 further comprising means for disconnecting said selected transfer means from said printer transfer means after said selected transfer means fails to send additional data or commands to said printer transfer means for a predetermined period of time.

18. The system of claim 16 further comprising means for disconnecting said FAX transfer means from said printer transfer means if said FAX transfer means sends a termination signal.

19. The system of claim 15 wherein said means for selectively connecting further comprises means for continuously examining said FAX transfer means and for receiving and storing a predetermined amount of data and commands from said FAX transfer means if said host transfer means is connected to said printer transfer means.

20. The system of claim 19 wherein said means for continuously examining further comprises means for indicating a busy condition to said FAX transfer means after receiving and storing said predetermined amount of data and commands and said host transfer means is still connected to said printer transfer means.

21. The system of claim 15 wherein said means for selectively connecting further comprises means for continuously examining said host transfer means and for indicating a busy condition to said host transfer means if said FAX transfer means is connected to said printer transfer means when said host transfer means sends a datum or command.

22. The system of claim 15 wherein said means for selectively connecting further comprises means for continuously examining said FAX transfer means and for indicating out of paper condition to said FAX transfer means if said host transfer means is connected to said printer transfer means when said FAX transfer means sends a datum or command.

* * * * *